UNITED STATES PATENT OFFICE.

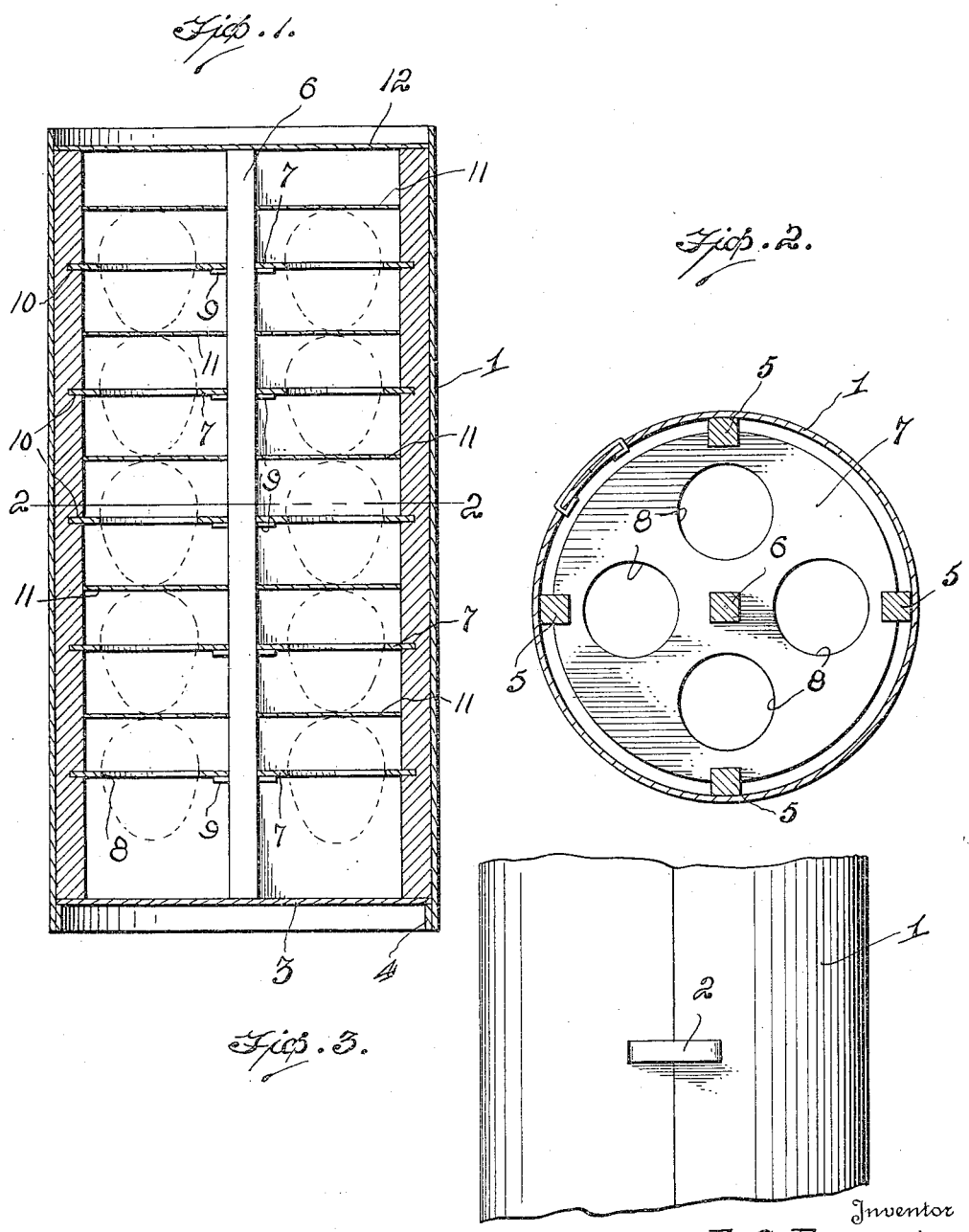

EDWIN C. FORREST, OF NEW YORK, N. Y.

EGG-CRATE.

1,168,186.   Specification of Letters Patent.   Patented Jan. 11, 1916.

Application filed February 19, 1915. Serial No. 9,360.

*To all whom it may concern:*

Be it known that I, EDWIN C. FORREST, a citizen of the United States, residing at New York, in the county of Bronx and State of New York, have invented certain new and useful Improvements in Egg-Crates; and I do hereby declare the following to be a full, clear, and exact description of the invention, such as will enable others skilled in the art to which it appertains to make and use the same.

This invention relates to egg crates and the principal object of the invention is to provide a crate which will hold a large number of eggs safely and which can be readily removed as an entirety from the crate.

Another object of the invention is to provide a crate having therein a rack containing a number of egg trays, said rack being readily removable from the crate with the eggs in the trays, thus providing means whereby the eggs may be placed in the trays and the trays placed in the rack and the rack placed in the crate, thus facilitating the handling of the eggs and providing a safe and efficient container for shipping eggs.

The foregoing and other objects may be attained by means of the construction illustrated in the accompanying drawing, in which—

Figure 1 is a vertical sectional view through a crate and showing the eggs placed in the trays connected to the rack, Fig. 2 is a horizontal sectional view taken on the line 2—2 of Fig. 1, and Fig. 3 is a side elevation showing the manner of connecting the edges of the crate.

Referring to the drawing, the numeral 1 designates the crate for the eggs, said crate being formed preferably of paper stock of the required strength and thickness, and comprising a flat sheet connected together at its edges by means of a metal fastening 2 which can be readily removed for shipping the crate flat and connected to the edges when desired. While the crate is shown as round or tubular in form it will be obvious that a square crate could be utilized if desired. The bottom 3 of the crate may be provided with an annular flange 4 to support the rack for containing the egg trays above the lower edge of the crate.

The egg rack comprises the bars 5, which are shown as rectangular in cross section, and a central vertical bar 6. The egg trays each comprise a disk 7 having holes 8 therein of the desired size to support an egg between the point and butt ends thereof, there being shown four such openings in the trays 7, but it will be understood that any suitable number may be utilized. The trays or disks 7 are supported upon the central bar 6 of the rack by removable pins 9 at the center, said disks being provided with a rectangular central opening through which the bar 6 extends, and pins 9 are inserted through the bar 6 underneath the disks to hold them in position centrally. The rack bars 5 are each provided with grooves 10 on their inner sides spaced apart, and the outer edges of the disks 7 are seated in said recesses, as shown more clearly in Fig. 1.

Separating disks 11, each provided with a rectangular central aperture are connected to the central bar 6 and separate the eggs in one tray from those in another. A disk 12 may be placed on top of the rack within the crate, and a suitable cover may be provided if desired.

From the foregoing it will be obvious that the rack consisting of the bars 5 and 6 and the trays 7 may be removed from the crate with the eggs in position in the trays in the rack, and said rack may be placed upon a table or counter so that the eggs may be inspected and they can be removed from the rack singly or in series.

Various changes may be made in the details of construction without departing from the spirit and scope of the invention as defined in the claim.

What is claimed is:—

An egg crate comprising a container cylindrical in cross section, a rack within said container, said rack comprising a plurality of vertical bars and a centrally disposed vertical bar positioned within the rack, a plurality of egg trays comprising disks having circular openings therein, the inner face of said rack bars being provided with spaced recesses, said trays being arranged on the central bar and held in place by means of pins positioned thereunder, the peripheral edges of said disks adapted to rest within the recesses on the inner face of the rack bars for normally holding said disks a spaced distance apart, a partition layer disposed between each of said disks adapted to prevent the eggs from engaging one another when positioned within the openings of the trays.

In testimony whereof I affix my signature in presence of two witnesses.

EDWIN C. FORREST.

Witnesses:
JOHN J. O'NEILL,
HENRY D. FREUDENBERG.

Copies of this patent may be obtained for five cents each, by addressing the "Commissioner of Patents, Washington, D. C."